July 3, 1928.

M. J. FORRESTER

VEHICLE TOP

Filed Aug. 5, 1926

INVENTOR
M. J. Forrester
By Rogers, Kennedy, Campbell
ATTORNEYS.

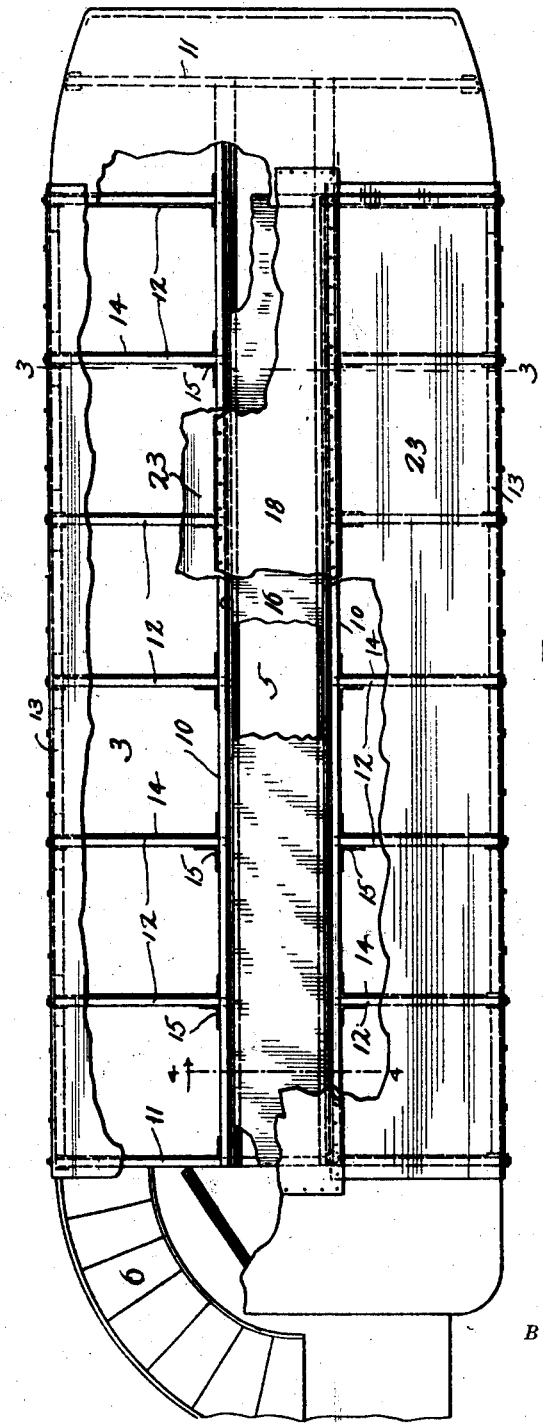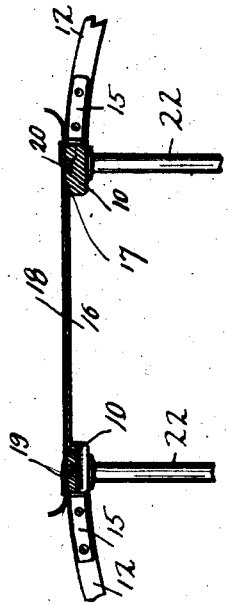

July 3, 1928.

M. J. FORRESTER 1,675,539

VEHICLE TOP

Filed Aug. 5, 1926

INVENTOR
M. J. Forrester
BY Rogers, Kennedy Campbell
ATTORNEYS.

Patented July 3, 1928.

1,675,539

UNITED STATES PATENT OFFICE.

MICHAEL J. FORRESTER, OF ASTORIA, NEW YORK, ASSIGNOR TO FIFTH AVENUE COACH COMPANY, A CORPORATION OF NEW YORK.

VEHICLE TOP.

Application filed August 5, 1926. Serial No. 127,240.

This invention relates to vehicle tops, designed more particularly to cover the upper deck of a double deck passenger vehicle or bus. In a type of vehicle of this character now in very general use, the upper deck is furnished with two rows of seats, one at either side, between which is an aisle running longitudinally of the deck and through which aisle the passengers pass in gaining access to the seats, the aisle being covered by a vehicle top to protect the passengers against inclement weather. It is of great importance that the maximum head room, within the allowable limits of the height of the vehicle top, be provided for the aisle, and that that part of the top extending directly over the aisle be unobstructed and smooth on its underside, so as to afford the greatest facility and comfort to the passengers traversing the aisle, and as far as possible avoiding the necessity of the passengers assuming a stooping posture in passing to the seats.

With these and other objects in view the invention consists of a vehicle top of improved form and arrangement, which will be fully described in the specification to follow, and the novel features thereof set forth in the appended claims.

In the accompanying drawings:

Fig. 2 is a top plan view of the same with parts broken away.

Fig. 4 is a transverse section on the line 4—4 of Fig. 2.

Figure 1:
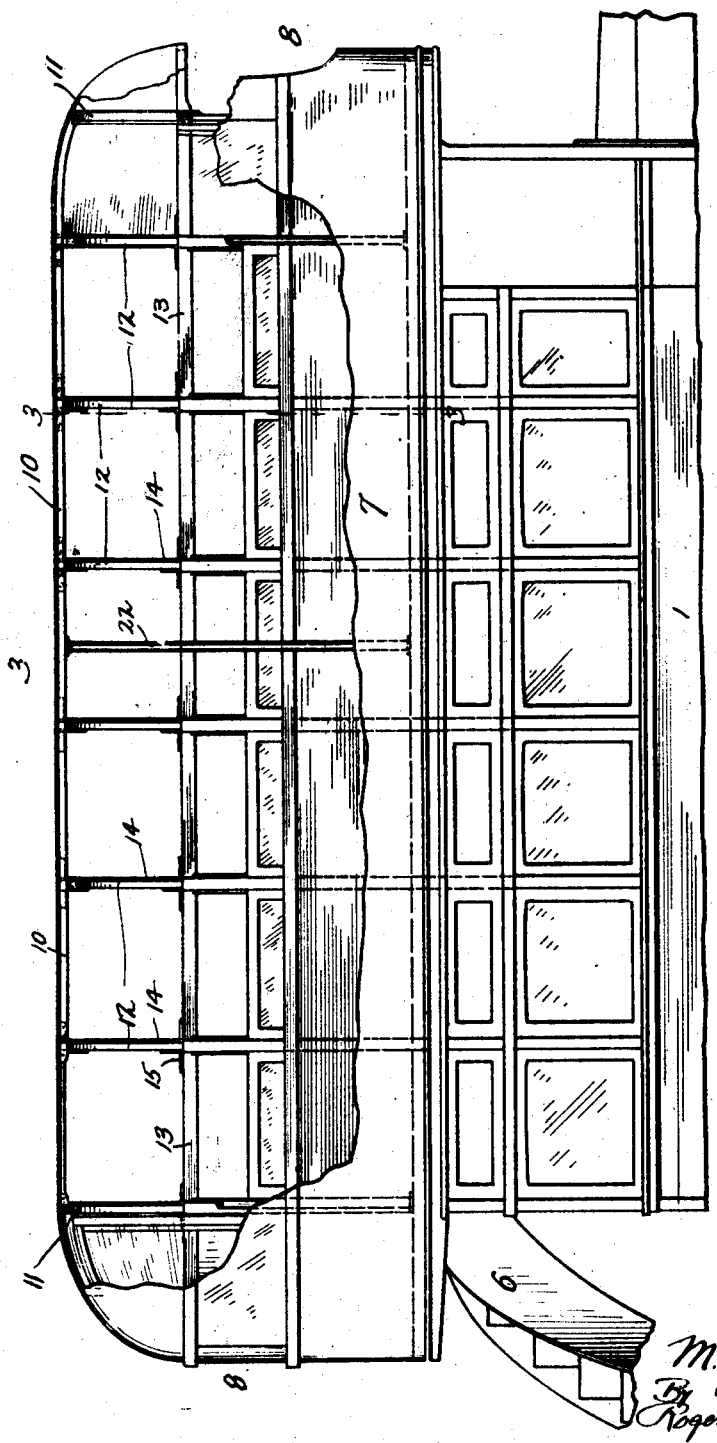
Fig. 1 is a side elevation of the body portion of a double deck passenger vehicle or bus, showing the same equipped with a vehicle top having my invention embodied therein, portions of the said top being broken away to better show the detail construction.

Referring to the drawings:

1 designates the body of a double deck passenger vehicle having an upper deck 2; and 3 designates a vehicle top covering the upper deck. Two rows of seats 4 are arranged as usual on the upper deck, between which rows is a central aisle 5 extending longitudinally throughout the length of the deck to the rear end thereof. To this aisle, steps 6 lead from the lower deck of the vehicle as usual.

The vehicle top comprises side and end portions 7 and 8 rising from the sides and ends of the deck 2, and a roof portion 9 supported by and forming an upward continuation of the side and end portions, and it is in the detailed form and construction of this roof portion with which my invention is concerned.

Figure 3:
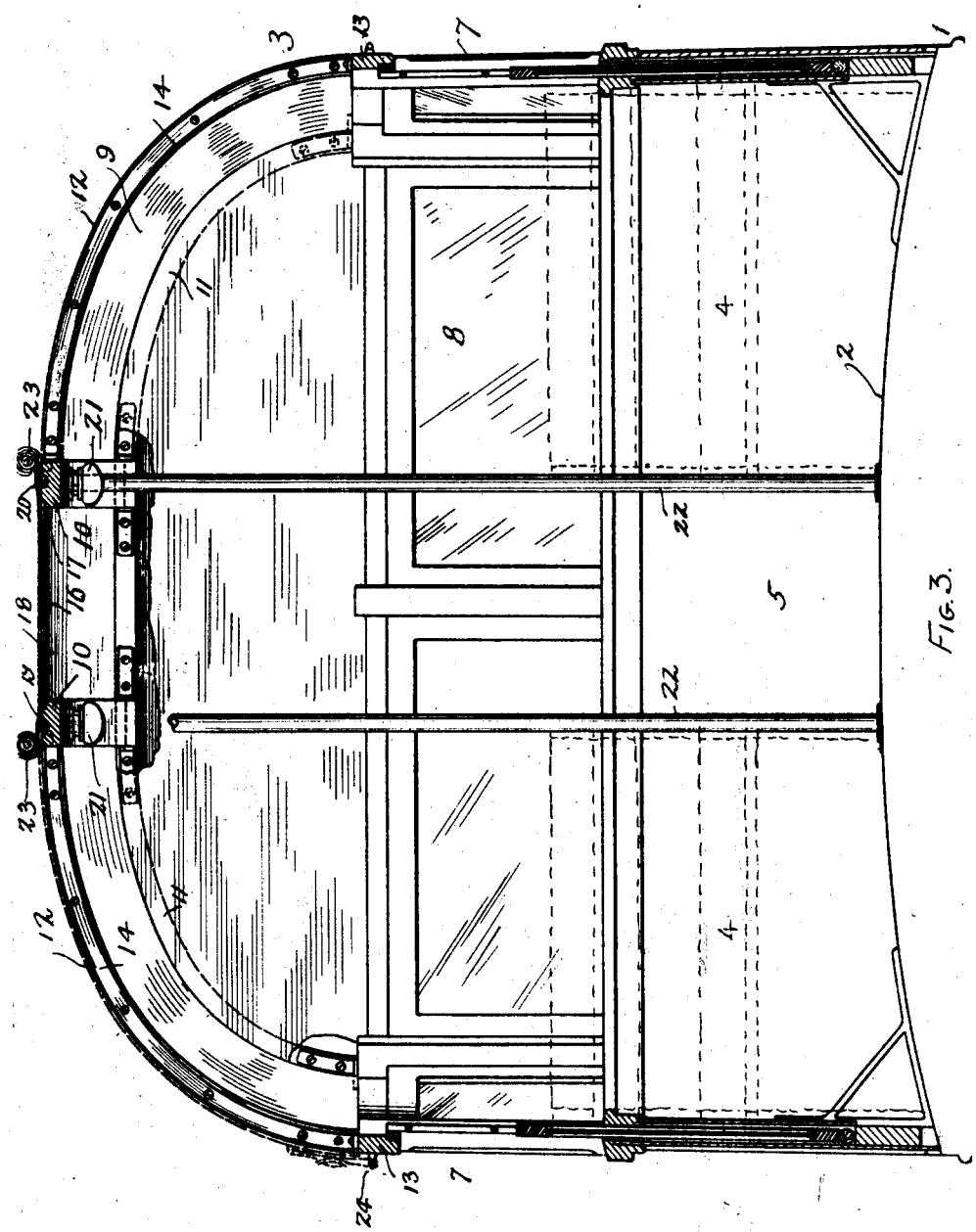
Fig. 3 is a transverse sectional elevation on an enlarged scale on the lines 3—3 of Figs. 1 and 2.

The roof portion 9 comprises two longitudinal spaced roof rails 10 extending on either side of the aisle space 5 and connected and supported at their ends to transversely extending end arched ribs 11, located respectively at the opposite ends of the structure. Two series of transverse ribs 12 are arranged between the respective longitudinal rails 10 and the side portions of the top, the inner ends of said ribs being attached to the outer sides of the longitudinal rails respectively, and extending outwardly and downwardly therefrom, have their opposite ends firmly fixed to side rails 13 built in the sides of the top structure as best shown in Fig. 3. The attachment of these ribs to the roof rails 10 and the side rails 13 may be effected in any suitable appropriate manner. In the present instance this is effected by carlines or metallic strips 14 fastened to the sides of the ribs 12, and having their ends bent laterally and fastened to the sides of the respective rails 10 and 13, angle irons 15 being fastened to the opposite sides of the ribs and to said rails so as to further brace and strengthen the connection of these parts.

A roof section 16, in the present instance in the form of a metallic plate preferably of aluminum, is fastened to the upper sides of the roof rails 10 so as to cover the longitudinal space between the rails and thus afford a roof covering for the aisle space. This plate is seated at its opposite edges in longitudinal recesses 17 formed in the upper sides of the roof rails 10 along their inner edges, the form and relative arrangement of these parts being such that when so seated, the upper surface of the roof plate will be flush with the upper surface of the roof rails; and the roof plate is covered with a non-metallic sheathing 18 preferably of canvas which is extended at its opposite edges beyond the edges of the roof plate and is fastened by suitable means to the upper sides of the roof rails as best shown in Fig. 4.

From the construction described, it will be seen that the under surface of the roof plate 16 is disposed in a plane above that of the under surface of the transverse ribs at the point where they are connected with the roof rails, thereby providing over the aisle an additional head room corresponding to the thickness of the ribs, the underside of the roof plate being smooth and unobstructed, so that there will be no danger of the heads of the passengers in traversing the aisle, coming in contact with overhead obstructions such as would be constituted by the transverse ribs were they extended continuously across the central portion of the vehicle top. It is to be noted in this connection that the roof plate extends as an uninterrupted continuation of the general contour of the vehicle top, and that the additional head room afforded as above mentioned, is gained without increasing the over all height of the top. This is an important consideration in the use of covered busses in cities where, on account of over head obstructions, such as trees, elevated structures, and the like, the height of the tops must be confined within certain limitations.

Channels 19 are formed in the upper sides of the roof rails to receive electric conductor wires 20, and dome lights 21 are supported by and depend from the under sides of said rails.

Vertical columns 22 extend upwardly from the deck 2 at opposite sides of the aisle and give support at their upper ends to the roof rails between the end ribs 11 supporting the ends of said rails.

The open spaces in the vehicle top between the transverse ribs 12 may be covered by a permanent roof covering, or in lieu thereof curtains 23 may be provided, which as shown in Fig. 3, are fastened at their inner edges to the roof rails and are adapted to be rolled downwardly and outwardly over the ribs and fastened at their lower edges to the side rails 13 as at 24, thereby constituting a cover or top for the structure, which, in fair weather may be folded, and in inclement weather extended to afford protection to the passengers.

In the foregoing description and accompaying drawings I have set forth my invention in the particular detailed form and construction of the parts which I prefer to adopt, but it will be understood that the invention is not limited to these details which may be variously changed without departing from the spirit of the invention; and further it will be understood that the invention is not limited to the particular form or construction of the parts except in so far as such limitations are specified in the claims.

Having thus described my invention, what I claim is:

1. In a vehicle top the combination of two longitudinally extending transversely spaced roof rails, transverse roof supporting ribs having their inner ends abutting against and fastened to the outer sides of the rails and extending thence outwardly and downwardly in continuous curves and supported at their lower ends in the sides of the vehicle top, and a roof plate fastened to the upper sides of the rails and bridging the space between them and forming an uninterrupted continuation of the contour of the vehicle top, said plate being free and unobstructed on its under side, and said transverse ribs being adapted to give support to a roof covering extending outwardly in opposite directions from the longitudinal roof rails flush with said roof plate.

2. In a vehicle top adapted to cover a vehicle deck having a passenger aisle thereon and a row of seats on each side of the aisle, the combination of two longitudinal roof rails extending above and at the sides of the aisle, transverse roof supporting ribs having their inner ends abutted against and secured to the outer sides of the rails and extending thence outwardly and downwardly in continuous curves over the two rows of seats, and supported at their lower ends in the sides of the vehicle top, and a roof plate fastened to the upper sides of the rails and bridging the space between them so as to cover the aisle, and forming an uninterrupted continuation of the contour of the vehicle top, said plate being unobstructed on its under side; whereby head room is afforded in the aisle of a height greater by the vertical thickness of the longitudinal rails less the thickness of the roof plate than the greatest height of the spaces over the passengers' seats.

In testimony whereof, I have affixed my signature hereto.

MICHAEL J. FORRESTER.